United States Patent [19]
Hicks et al.

[11] Patent Number: 5,918,429
[45] Date of Patent: Jul. 6, 1999

[54] METHOD AND APPARATUS FOR PROVIDING CONCRETE PRODUCTS HAVING IMPROVED SURFACE AND STRUCTURAL CHARACTERISTICS

[75] Inventors: James K. Hicks, Lawrenceville; John O. Winchester, Atlanta; Richard R. Nicholson, Doraville, all of Ga.

[73] Assignee: The Quikrete Companies, Atlanta, Ga.

[21] Appl. No.: 08/910,631

[22] Filed: Aug. 13, 1997

[51] Int. Cl.$^6$ .............................. E04F 11/16; C04B 9/12
[52] U.S. Cl. .......................... 52/181; 52/612; 52/DIG. 9; 106/689; 106/778; 106/802
[58] Field of Search .................. 524/2, 4, 5, 6, 524/7, 8; 106/689, 778, 802; 52/181, 612, DIG. 9

[56] References Cited

U.S. PATENT DOCUMENTS

| | | |
|---|---|---|
| 5,075,358 | 12/1991 | Riley et al. . |
| 5,185,389 | 2/1993 | Victor . |
| 5,244,304 | 9/1993 | Weill et al. . |
| 5,290,356 | 3/1994 | Frankowski . |
| 5,391,226 | 2/1995 | Frankowski . |

*Primary Examiner*—Christopher Kent
*Attorney, Agent, or Firm*—Jones & Askew

[57] ABSTRACT

Disclosed is a method for providing an improved cementitious product which includes improved surface characteristics such as skid resistance, as well as improved structural characteristics such as flexural toughness. The product is provided by the inclusion of skid-resistant particles within an uncured cement product, such that the product eventually cures with the skid-resistant particles fixed at and adjacent to the surface, providing improved skid resistance to the cement product its supporting surface, which could be a pedestrian sidewalk, steps, a vehicle roadway, handicapped ramps, or other surfaces where skid resistance is required. The product is desirably softer in structure than traditional concrete structures to allow for desirable wearing by traffic thereon to continuously expose new rubber particles, while still having integral properties which discourage pullout of the particles.

8 Claims, 12 Drawing Sheets

| Material | Percent by Weight |
|---|---|
| Portland Cement, Type II | 32 |
| Pulverized Limestone | 5.21 |
| 1/4" polypropylene monofilament fibers | 0.05 |
| Ethylene/vinyl acetate copolymer (Elotex 50E100) | 2.5 |
| Melamine Formaldehyde condensate (Melment F-10) | 0.16 |
| Hydroxypropyl methyl cellulose ether (Methocel K4M) | 0.03 |
| Solid Defoamer (Mazu DF 1103) | 0.05 |
| Ground Recycled rubber tires (20 Mesh) | 10 |
| Blended Silica Sand (Predominently 20-100 mesh) | 50 |
| Total | 100 |

Fig. 8

| | Trowel Consistency |
|---|---|
| Water content | 17.5 |
| Unit weight | 108 |
| Compressive strengths (C109) | |
| 1 day | 500 |
| 7 day | 1,630 |
| 28 day | 2,345 |

Fig. 9

| Material | Percent by Weight |
|---|---|
| Portland Cement, Type II | 48 |
| Calcium Sulfoaluminate (Rockfast 450) | 3 |
| Calcium Sulfate Anhydrite (Snow White Filler) | 1.5 |
| 1/4" Polypropylene monofilament fibers | 0.05 |
| Ethylene/vinyl acetate copolymer (Elotax 50E100) | 2.5 |
| Melamine formaldehyde condensate (Melment F-10) | 0.16 |
| Hydroxypropyl methyl cellulose ether (Methocel K4M) | 0.03 |
| Solid Defoamer (Mazu DF 1103) | 0.05 |
| Ground Recycled rubber tires (20 Mesh) | 6.5 |
| Masonry Sand (ASTM C 144) | 38.21 |
| Total | 100 |

Fig. 10

|  | Trowel Consistency | Screedable Consistency |
|---|---|---|
| Mix temp. | 74 | 73 |
| Water content (% of dry weight) | 19.5 | 28 |
| Unit Weight (lb/cu. ft.) | 120.9 | 115.2 |
| Flow Table % | 105 | N/T |
| Compressive Strengths (C 109) | | |
| 1 day | 2560 | 1070 |
| 7 day | 4690 | 2820 |
| 28 day | 5240 | 4560 |
| C 157 Shrinkage Testing in Water | | |
| 3 day shrinkage (%) | .007 | N/T |
| 7 day shrinkage (%) | .010 | .039 |
| 28 day shrinkage (%) | | |
| C 157 Shrinkage Testing in Air | | |
| 3 day shrinkage (%) | | -.018 |
| 7 day shrinkage (%) | | -0.0310 |

Fig. 11

(mix #348-50)

| Raw Material | Percent by Weight |
|---|---|
| Holnam Type III Portland | 48.000 |
| Butler Masons sand C144 | 37.950 |
| Rubber (20 mesh) | 6.500 |
| 1/4" polypropylene fibers | 0.050 |
| Concentrate | 7.500 |
| TOTALS | 100.000 |

Fig. 12

| Raw Material | Percent by Weight |
|---|---|
| Rockfast 450 | 40.000 |
| Elotex 50E100 | 33.333 |
| Snow White Filler | 20.000 |
| -44 silica sand (Grade D) | 3.437 |
| Melment F10 | 2.133 |
| Mazu DF 1103 | 0.667 |
| Methocal K4M | 0.400 |
| Dye/Tracer | 0.030 |
| TOTALS | 100.000 |

Fig. 13

CONCRETE RESURFACER

Determining flow spec for screedable consistency

| Material | | 348-51 | 348-52 | 348-53 | 348-54 |
|---|---|---|---|---|---|
| | | correct flow | repeat of 50 | devulcanized rubber | devulcanized rubber |
| | | percent | percent | percent | percent |
| Holnam type III | | 28.5 | 48 | 48 | 45 |
| Rockfast 450 | | 3 | 3 | 3 | 3 |
| Snow White Filler | | 1.5 | 1.5 | 1.5 | 1.5 |
| 1/4" polyprop. fibers | | 0.05 | 0.05 | 0.05 | 0.05 |
| Elotex 50E100 | | 2.5 | 2.5 | 2.5 | 2.5 |
| Melment F-10 | | 0.16 | 0.16 | 0.16 | 0.16 |
| Methocel K4M | | 0.03 | 0.03 | 0.03 | 0.03 |
| Mazu OF 1103 | | 0.05 | 0.05 | 0.05 | 0.05 |
| Rubber (20 Mesh) | | | 6.5 | | |
| Rubber (devulcanized) | | | | 6.5 | 9.5 |
| Butler Masonry Sand | | 64.21 | 38.21 | 38.21 | 38.21 |
| Total | | 100 | 100 | 100 | 100 |

Test Results    Criteria

| Mix Method | | 3 min slow | 3 min. slow | 3 min. slow | 3 min. slow |
|---|---|---|---|---|---|
| Mix Temperature | | 73 | 73 | 73 | 73 |
| Water Content | | 19.7 | 24.2 | 24 | 24 |
| Unit Weight | | 126.1 | 115.8 | 118.6 | 111.9 |
| Flow (3) | test at 10 drops | 106 | 104 | 101 | 100 |
| cone penetrometer (3) | | 81 | not tested | not tested | not tested |
| Compressive strengths (C109) | | | | | |
| 1 day | | 1320 | 1520 | 1654 | 1370 |
| 7 day | | 3730 | 3480 | 3820 | 3080 |
| 28 day | | 5300 | 4580 | 4780 | 3980 |
| C157 testing in water | | | | | |
| 3 day shrinkage (%) | | | | | +.056 |
| 7 day shrinkage (%) | | +.07 | +.034 | +.064 | +.059 |
| 28 day shrinkage (%) | | +.081 | +.039 | +.071 | +.023 |
| C157 Testing in Air | | | | | |
| 3 day shrinkage (%) | | | | | -.035 |
| 7 day shrinkage (%) | | +0.046 | -0.0030 | +0.75 | +0.095 |
| 28 day shrinkage (%) | | -0.0650 | 0.0000 | -.138 | -.188 |

Shrinkage readings (for lab use only)

| C157 Testing in water | | | | | |
|---|---|---|---|---|---|
| 1 day reading | | | | | -.0234 |
| 3 day reading | | | | | -.0178 |
| 7 day reading | | | | | -0.0175 |
| 28 day reading | | | | | -0181 |
| C 157 Testing in Air | | | | | |
| 1 day reading | | | | | -0453 |
| 3 day reading | | | | | -0478 |
| 7 day reading | | | | | -0.0548 |
| 28 day reading | | | | | -.0841 |

Fig. 14

CONCRETE RESURFACER

| Material | | 348-55 devulcanized rubber percent |
|---|---|---|
| Holnam type III | | 36 |
| Rockfast 450 | | 2.4 |
| Snow White Filler | | 1.2 |
| 1/4" polyprop.fibers | | 0.05 |
| Elotex 50E100 | | 2.5 |
| Melment F-10 | | 0.16 |
| Methocel K4M | | 0.03 |
| Mazu DF 1103 | | 0.05 |
| Rubber (20 Mesh) | | |
| Rubber (devulcanized) | | 12.5 |
| Butler Masonry Sand | | 45.11 |
| Total | | 100 |
| Check sum | | |
| | | |
| Test Results | Criteria | |
| Mix Method | | 3 min. slow |
| Mix Temperature | | 73 |
| Water Content | | 24 |
| Unit weight | | 106 |
| Flow (10 drops) | 95-105 | 105 |
| Compressive strengths (C 109) | | |
| 1 day | | 630 |
| 7 day | | 1660 |
| 28 day | | 2370 |
| C 157 Testing in Water | | |
| 3 day shrinkage (%) | | +.052 |
| 7 day shrinkage (%) | | +.058 |
| 28 day shrinkage (%) | | +.073 |
| C 157 Testing in Air | | |
| 3 day shrinkage (%) | | -.01 |
| 7 day shrinkage (%) | | -.059 |
| 28 day shrinkage (%) | | -.118 |

Fig. 15

CONCRETE RESURFACER
Comparison between Devulcanized Rubber with 5 mesh crumbs and non rubber version

| Material | | 348-56 devulcanized rubber w/5mesh crumbs | 348-57 devulcanized rubber w/5 mesh crumbs | 348-58 without rubber |
|---|---|---|---|---|
| | | percent | percent | percent |
| Holnam type III | | 36 | 36 | 28.5 |
| Rockfast 450 | | 2.4 | 2.4 | 3 |
| Snow White Filler | | 1.2 | 1.2 | 1.5 |
| 1/4" polyprop. fibers | | 0.05 | 0.05 | 0.05 |
| Elotex 50E100 | | 2.5 | 2.5 | 2.5 |
| Melment F-10 | | 0.16 | 0.16 | 0.16 |
| Methocel K4M | | 0.03 | 0.03 | 0.03 |
| Mazu DF 1103 | | 0.05 | 0.05 | 0.05 |
| Rubber (devulcanized) | | 10 | 12.5 | |
| Butler Masonry Sand | | 47.61 | 45.11 | 64.21 |
| Totals | | 100 | 100 | 100 |
| Test Results | Criteria | | | |
| Mix Method | | 3 min. slow | 3 min. slow | 3 min. slow |
| Mix Temperature | | 71 | 72 | 72 |
| Water Content | | 19.8 | 20.8 | 16.9 |
| Unit Weight | | 112.2 | 104.3 | 123.6 |
| Flow (10 drops) | 95-105 | 105 | 96 | 95 |
| Compressive strengths (C 109) | | | | |
| 1 day | | 440 | 580 | 1060 |
| 7 day | | 1690 | 1730 | 4520 |
| 28 day | | 2280 | 2480 | 6280 |
| C 157 Testing in Water | | | | |
| 3 day shrinkage (%) | | +.025 | +.04 | +.05 |
| 7 day shrinkage (%) | | +.033 | +.046 | +.054 |
| 28 day shrinkage (%) | | +.053 | +.066 | +.054 |
| C 157 Testing in Air | | | | |
| 3 day shrinkage (%) | | -.024 | -.039 | -0.0410 |
| 7 day shrinkage (%) | | -.07 | -.093 | NA |
| 28 day shrinkage (%) | | .103 | -.164 | NA |

Fig. 16

| Material | Concrete Resurfacer | | Skid Resistant Concrete Resurfacer | |
|---|---|---|---|---|
| | Percent | Pounds | Percent | Pounds |
| Holnam Type III | 28.5 | 570 | 40 | 800 |
| Rockfast 450 | 3 | 60 | 2.67 | 53.4 |
| Snow White Filler | 1.5 | 30 | 1.33 | 26.6 |
| 1/4" polyprop. fibers | 0.05 | 1 | 0.05 | 1 |
| Elotex 50E100 | 2.5 | 50 | 2.5 | 50 |
| Melment F-10 | 0.16 | 3.2 | 0.16 | 3.2 |
| Methocel K4M | 0.03 | 0.6 | 0.03 | 0.6 |
| Mazu DF 1103 | 0.05 | 1 | 0.05 | 1 |
| Devulcanized Rubber (10 Mesh) | | 0 | 10 | 200 |
| Butler Masonry Sand | 64.21 | 1284.2 | 43.21 | 864.2 |
| Total | 100 | 2000 | 100 | 2000 |
| Check sum | | 2000 | | 2000 |

Fig. 17

CONCRETE RESURFACER
Use of Type I cement

| Material | 348-61 with rubber | 348-62 with rubber | 348-63 no rubber | 348-64 no rubber |
|---|---|---|---|---|
| | percent | percent | percent | percent |
| Holnam type I | 48 | 48 | | |
| Medusa Type I | | | 28.5 | 28.5 |
| Rockfast 450 | 3 | 3 | 3 | 3 |
| Snow White Filler | 1.5 | 1.5 | 1.5 | 1.5 |
| 1/4" polyprop.fibers | 0.05 | 0.05 | 0.05 | 0.05 |
| Elotex 50E100 | 5 | 5 | 2.5 | 2.5 |
| Melment F-10 | 0.16 | 0.16 | 0.16 | 0.16 |
| Methocel K4M | 0.03 | 0.03 | 0.03 | 0.03 |
| Mazu DF 1103 | 0.05 | 0.05 | 0.05 | 0.05 |
| 10 mesh rubber chips, devulcanized | 6.5 | | | |
| 40 mesh rubber chips, devulvanized | | 6.5 | | |
| Butler Masonry Sand | 35.71 | 35.71 | | |
| PIT grade B sand | | | 64.21 | |
| Russell sand | | | | 60.88 |
| dryer fines | | | | 3.33 |
| Total | 100 | 100 | 100 | 100 |
| check sums | | | | |
| Test Results | Criteria | | | |
| Mix Method | 3 min. slow | 3 min. slow | 3 min. slow | 3 min. slow |
| Mix Temperature | 72 | 72 | 72 | 72 |
| Water Content | 21.3 | 23.3 | 17.2 | 16.9 |
| Unit Weight | 115.8 | | 127.9 | 128.1 |
| Flow (10 drops) | 100 | skid samples | 105 | 97 |
| Working Time (1) | 45 | only | 35 | 25 |
| Final Set | ~300 min. | | 210 min. | 180 min. |
| Compressive strengths (C 109) | | | | |
| 1 day | 1220 | | 1470 | 2090 |
| 7 day | 2870 | | 4570 | 5660 |
| 28 day | 4730 | | 5910 | 6990 |
| C 157 Testing in Water | | | | |
| 3 day shrinkage (%) | +.087 | | +.005 | +.025 |
| 7 day shrinkage (%) | +.099 | | +.013 | +.038 |
| 28 day shrinkage (%) | +.134 | | +.028 | +.048 |
| C 157 Testing in Air | | | | |
| 3 day shrinkage (%) | -.002 | | -.018 | -.012 |
| 7 day shrinkage (%) | -.03 | | -.044 | -.064 |
| 28 day shrinkage (%) | -.091 | | -.087 | -.094 |

Fig. 18

|  | Skid Resistance Value (BPN Number) | |
| --- | --- | --- |
|  | Wet Condition | Dry Condition |
| Sawed Surface | 70.3 | 79.0 |
| Molded Surface | 32.3 | 73.0 |

5,918,429

METHOD AND APPARATUS FOR PROVIDING CONCRETE PRODUCTS HAVING IMPROVED SURFACE AND STRUCTURAL CHARACTERISTICS

TECHNICAL FIELD

This invention relates in general to concrete products and particularly relates to a concrete product which has improved skid-resistant and flexural toughness characteristics, and a method for providing same. In practicing one feature of the invention, the recycling of waste material such as tire rubber may also be effected, providing an advantageous environmental impact.

BACKGROUND OF THE INVENTION

In the prior art, it is readily known to provide cementitious mixtures such as cement or concrete in order to construct structures capable of carrying a load. For example, such mixtures may be used to provide structural concrete beams which may be integrated into a larger structure such as a building. Such mixtures may also be used to provide road and walkway structures for supporting vehicle and pedestrian traffic thereon. As may be readily understood, in the instance of vehicle and pedestrian traffic, it is often critical from a safety standpoint that the upwardly supporting surface of the cementitious structure have a surface characteristic which facilitates adequate frictional contact between the structure and the traffic thereon. This is particularly true for concrete paving surfaces, which tend to wear to a smooth surface.

In light of the above concerns, the prior art has developed to include various means of modifying the surface characteristics of concrete. For example, techniques are well known in the art which include the use of various tools for physically "roughening" the surface of concrete or cement, which as may be understood can include gouging the surface of the product as or after it cures. Although this process can prove effective, it also has disadvantages in that the gouging may need to be closely controlled if an aesthetically pleasing surface is desired.

However, there is also a need in the art for a cementitious product which can be used as an overlayment in many cases without the need for extensive priming of the supporting surface. A need in the art also exists for a structure which improved skid and impact resistance while still maintaining improved pullout characteristics and maintaining sufficient structural strength and flexural toughness. A need in the art also exists for a structure which provides improved skid-resistant properties not only immediately after its placement but throughout its life. A need in the art always exists for the re-use of waste material such as tire rubber, providing an advantageous environmental impact.

SUMMARY OF THE INVENTION

The present invention addresses needs in the prior art, and meets these needs by providing an improved cementitious product which can be used as an overlayment in many cases without the need for extensive priming of the supporting surface. The present invention also provides such a structure which includes the use of a mixture of hydraulic cement and rubber particles which is provides improved skid and impact resistance while still maintaining improved pullout characteristics and maintaining sufficient structural strength. The configuration includes a desirably less amount of hydraulic cement to allow for continuous wear of the overlaid structure to allow the rubber particles therein to be continuously exposed to the traffic thereon. In practicing one feature of the invention, the re-use of waste material such as tire rubber may also be effected, providing an advantageous environmental impact.

Generally described, the present invention provides an improved cementitious product which includes rubber or similar particles in the vicinity of the supporting surface of the product, to provide improved surface characteristics.

Therefore, it is an object of the present invention to provide an improved cementitious structure.

It is a further object of the present invention to provide an improved cementitious structure which includes improved flexural toughness.

It is a further object of the present invention to provide an improved cementitious structure which includes improved surface characteristics.

It is a further object of the present invention to provide an improved cementitious structure which includes improved frictional characteristics at its supporting surface.

It is a further object of the present invention to provide an improved cementitious structure which is cost-effective to produce.

It is a further object of the present invention to provide an improved cementitious structure which is cost-effective to maintain.

It is a further object of the present invention to provide a cementitious mixture which includes improved wear characteristics.

It is a further object of the present invention to provide a cementitious structure which includes improved wear characteristics not only immediately after application, but likewise throughout its life.

It is a further object of the present invention to provide a cementitious mixture which includes improved rubber particle pullout characteristics.

It is a further object of the present invention to provide a cementitious mixture which includes a combination of sufficient strength while still providing sufficient pullout strength.

It is a further object of the present invention to provide a cementitious structure which can be used as an overlayment.

It is a further object of the present invention to provide an improved cementitious structure while at the same time recycling waste products such as automobile tires.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

Reference is now made to the drawings, in which like numerals designate like items throughout the several views.

The Product Generally

Figure 1:
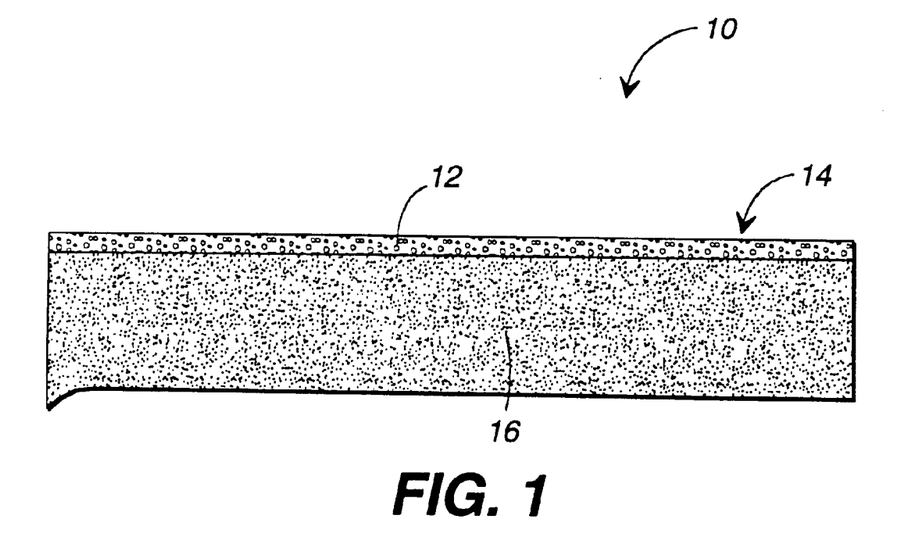
FIG. 1 is an illustrative views of a cross sections of a cement product 10 according to the present invention, having a top skid-resistant surface 14 and including an overlayment of resurfacing portion 12 and a base portion 16.

Reference is now made to FIG. 1, which is a illustrative view of a section of a cementitious product 10 (such as a walkway or roadway) according to the present invention. The product 10 includes an upper layer 12, and a lower body portion 16. The upper layer 12 defines an upwardly-directed supporting surface 14.

The upper layer 12 of the cement product 10 is integral with the body portion 16, that is, the product 10 is of one-piece construction although as discussed below the layers may have been applied and cured separately. The upper layer 12 includes a higher concentration of skid-resistant particles in comparison to the main body portion 16. As discussed later, the skid-resistant particles can be introduced into the top layer 12 between or after the layer has been applied.

The thickness of the overlaid layer 12 can be approximately ⅛ inch to 3 inches, although typically ¼–½ inch thick layers will be used. As noted below, the layer can be applied to any sound surface including by manners similar to prior art overlayments.

The Application Processes

Figure 2:
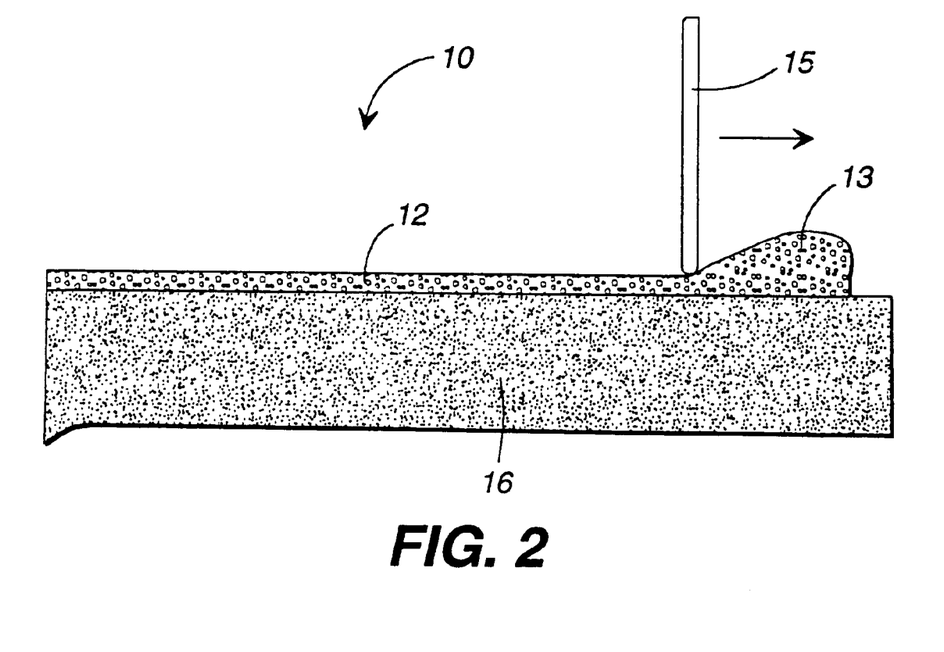
FIG. 2 is an illustrative view of a process of applying a "resurfacer" (or "overlayment") portion 12, including skid-resistant particles, to the surface of an existing cement product 16 such as a pedestrian walkway, by use of a trowel 15.

Reference is now made to FIG. 2, which is an illustrative view showing one method of application of a skid-resistant particle mixture 13 upon the upper surface of an existing cement product 16. Under this method of application, a hand trowel 14 on other suitable applicator used to spread the particle mixture 12 atop existing cement product.

It should be understood that it is preferable that the upper surface of the underlying base layer be cleaned as well as possible to remove organic growths such as algae, or to remove other bond breakers such as waxes or oils. Scarification can also be used as desired.

Figure 3:
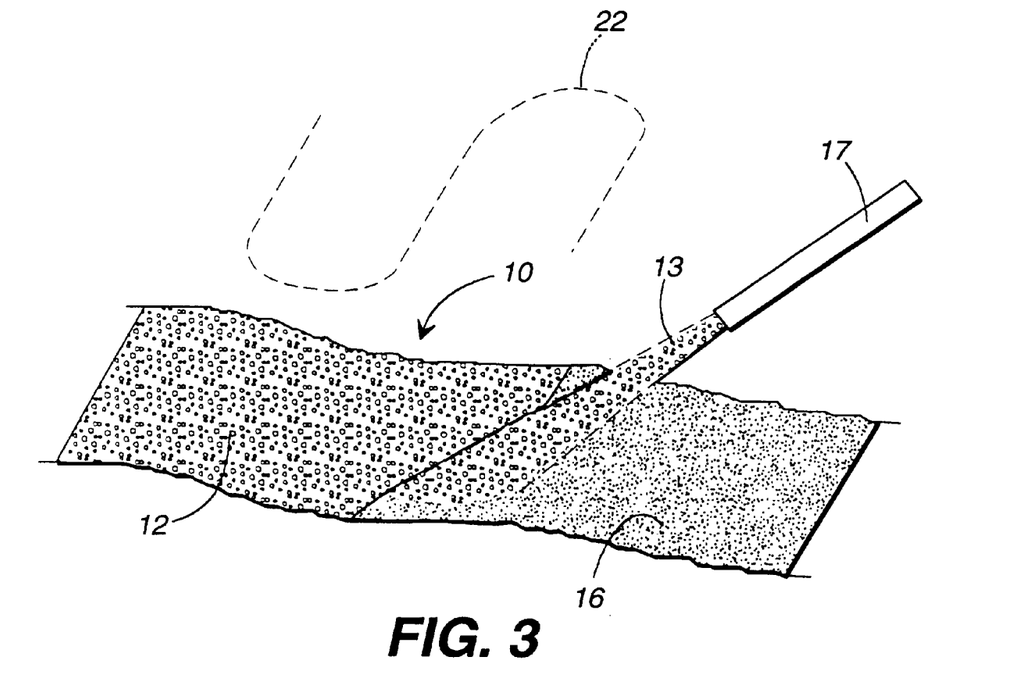
FIG. 3 is an illustrative view of the application of skid-resistant resurfacing mixture 13 by use of a sprayer 17.

As shown in FIG. 3, a spray applicator 17 may also be used to apply the skid-resistant particle mixture 13 to the surface of the existing product 16 by a back-and-forth or serpentine path such as shown by dotted line 22. The mixture may be blown by means of air or liquid pressure, or may also be applied through a simple controlled gravity drop. If the mixture is dropped into place, additional troweling may be used if desired. It should be understood that either wet or dry spraying techniques could be used as desired.

Figure 4:
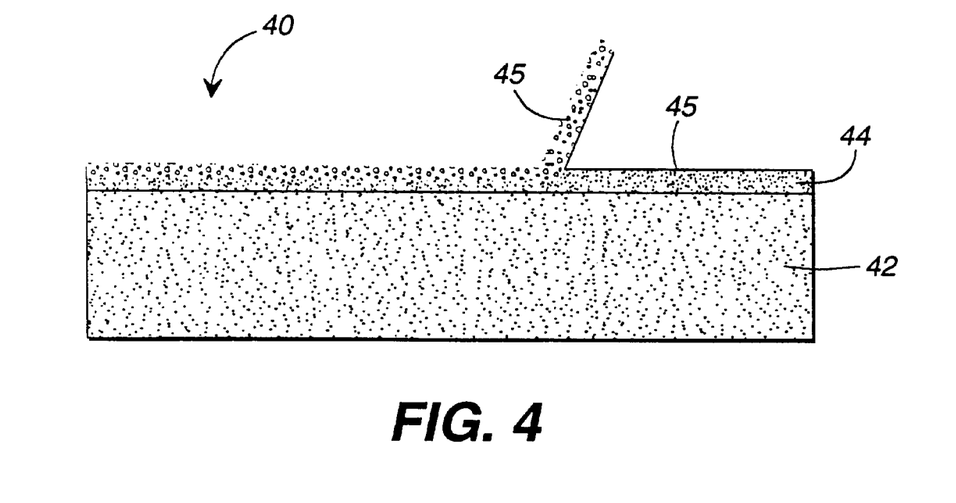
FIG. 4 is a side, cross sectional view illustrating the application of rubber particles 46 separately from the overlayment layer 44, which has been previously applied upon a preexisting base portion 42. The straight line is an interface between the two elements 42, 44. The rubber particles 46 are applied such that they enter into the top surface 45 of the overlayment layer 44.

FIG. 4 shows a process in which the rubber particles 46 are added after the layer 44 has been applied atop the preexisting base member 42, to create an overall product 40 defining a skid resistant surface. It should be understood that in this configuration less rubber by percentage will likely be used.

As may be understood, there is a particular need in the art to provide cementitious mixtures which may be readily handled and applied. As an example only, under the present invention a user could mix dry bag contents with water (which could include a suitable acrylic), smooth with a trowel and then wait 72 hours. Surface treatment could then be done by etching with a 10% muriatic acid. Other typical exposed aggregate techniques could be used such as spraying the surface of the finish troweled skid resistant concrete surfacer with water at the time of set to remove a slight amount of cementious material leaving the exposed aggregate.

Locations of Skid-resistant Surfaces

Figure 5:
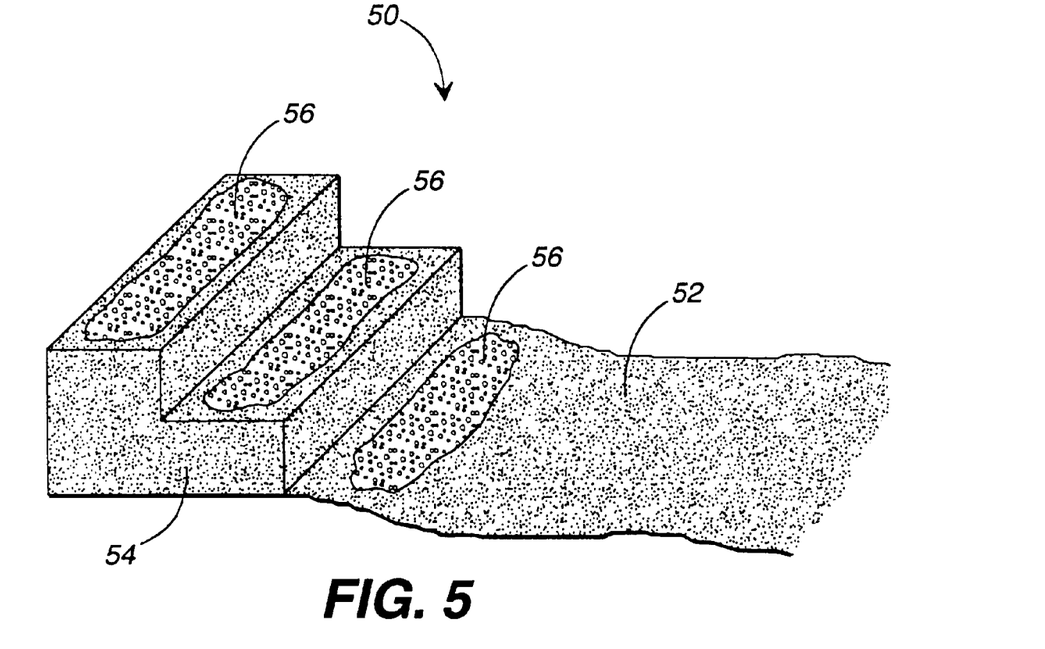
FIG. 5 is a an illustrative view of a walkway 52 and associated steps 54, with skid-resistant particles applied to selected surfaces of both.

As shown in FIG. 5, the present invention allows for the provision of selected skid-resistant surfaces at locations which may require special attention. For example, as shown at 50, a pedestrian walkway 52 leads to a set of stairs 54. As may be understood, a skid-resistant particle mixture can be applied or the etching process may be used at locations 36 to provide local skid-resistant surfaces at locations 56 deemed to need special attention, such as on the stair surfaces and at the walkway landing location at the base of the stairs.

Although not shown, it should be understood that skid-resistant treatment as noted above could also be applied to wheelchair ramps.

Figure 6:
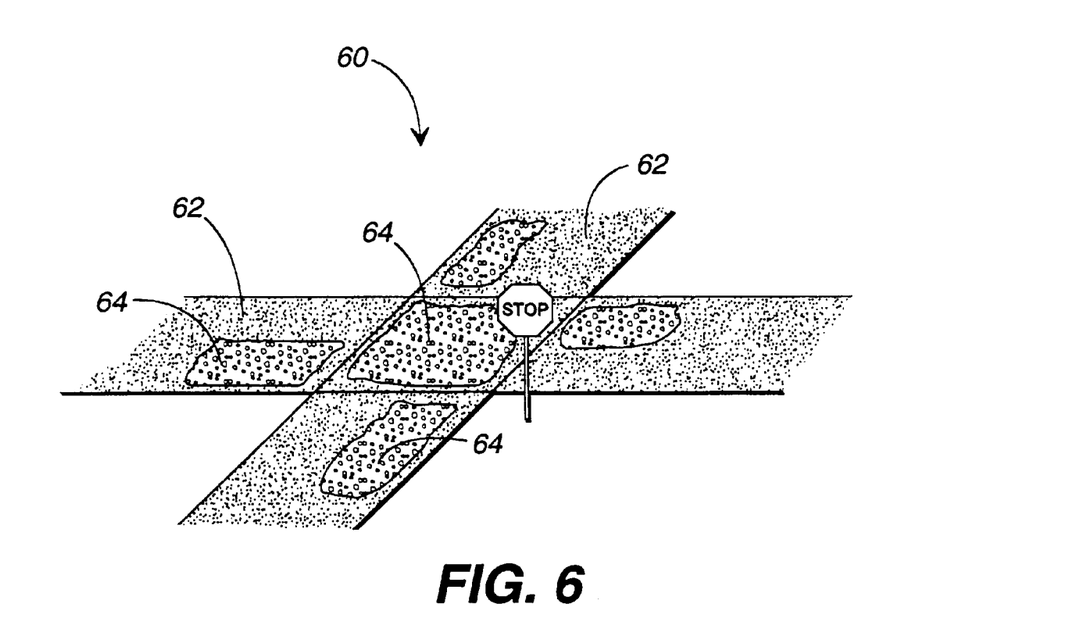
FIG. 6 is a an illustrative view of a vehicle roadway intersection 60, with skid-resistant particles applied to selected surfaces thereof.

Similarly, as shown in FIG. 6, the present invention allows for the provision of selected skid-resistant surfaces on vehicle roadways. For example, an intersection 60 of multiple vehicle roadways 62 may be supplied with localized skid-resistant surface portions 64 which provide additional traction as desired.

Mixtures Used; Reference to Charts

FIGS. 7–16 include a series of charts which disclose various overlayment mixtures and their properties. As may be seen, various separate mixtures are disclosed.

Figure 7:
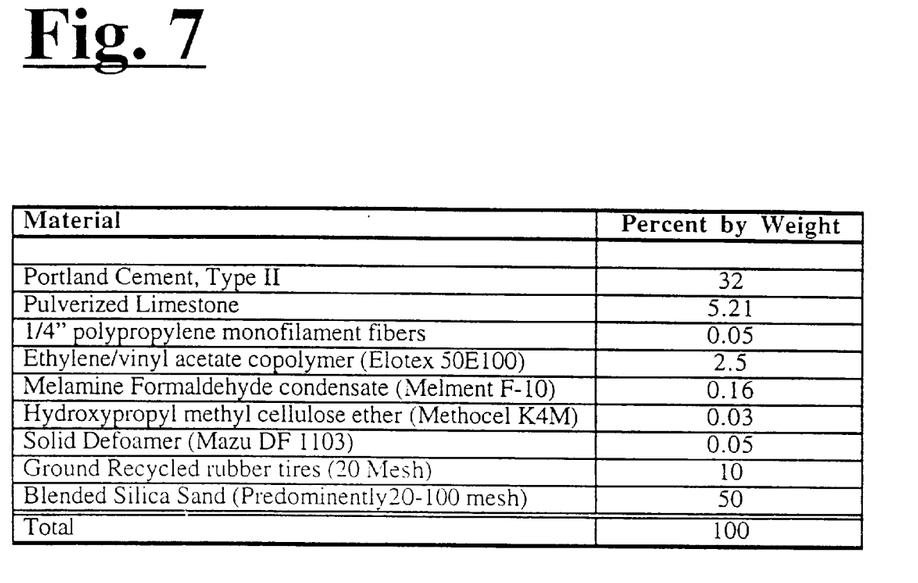
FIG. 7 is a chart showing the content by weight of a first skid-resistant resurfacing mixture according to the present invention.
Figure 8:
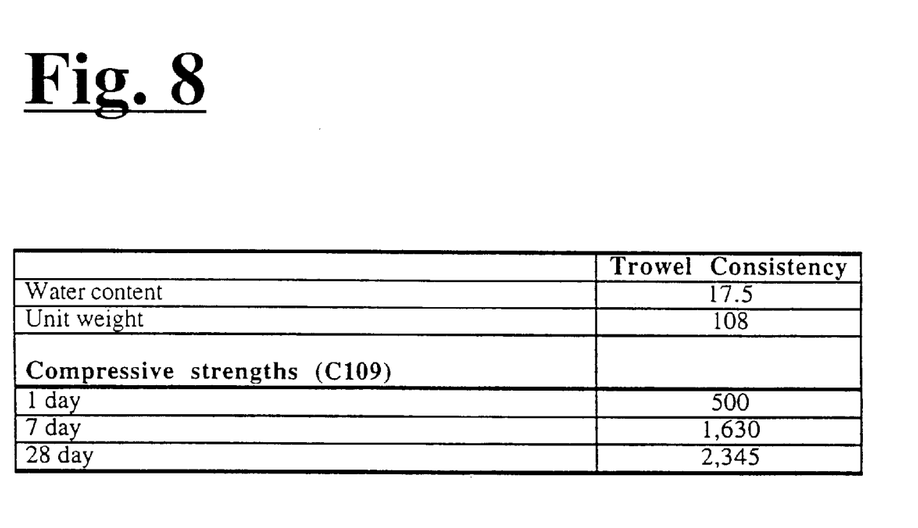
FIG. 8 is a chart shown certain characteristics of the first skid-resistant resurfacing mixture upon troweling and after curing.

FIG. 7 is a chart showing the content by weight of a first skid-resistant resurfacing mixture according to the present invention. FIG. 8 is a chart shown certain characteristics of the skid-resistant resurfacing mixture shown in FIG. 7 upon troweling and after curing.

Figure 9:
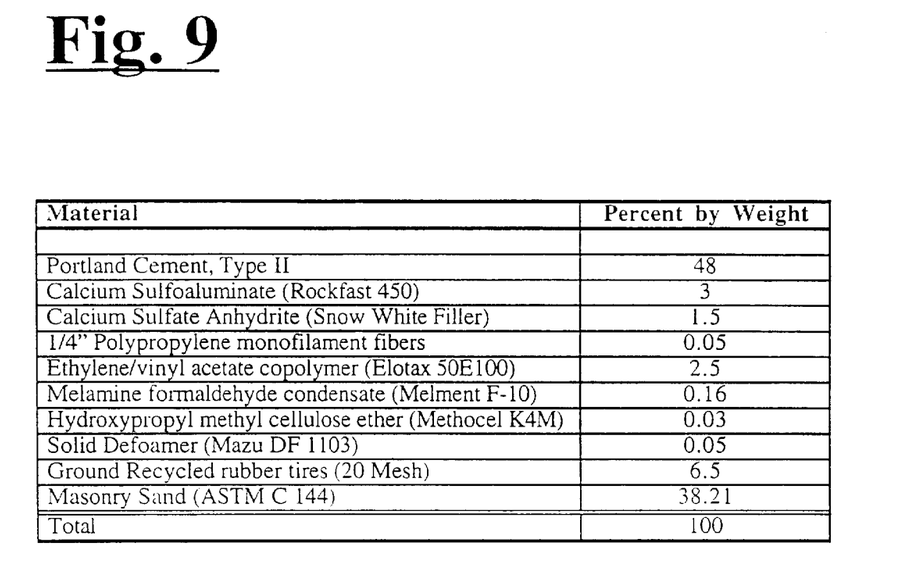
FIG. 9 is a chart showing the content by weight of a second skid-resistant resurfacing mixture according to the present invention.
Figure 10:
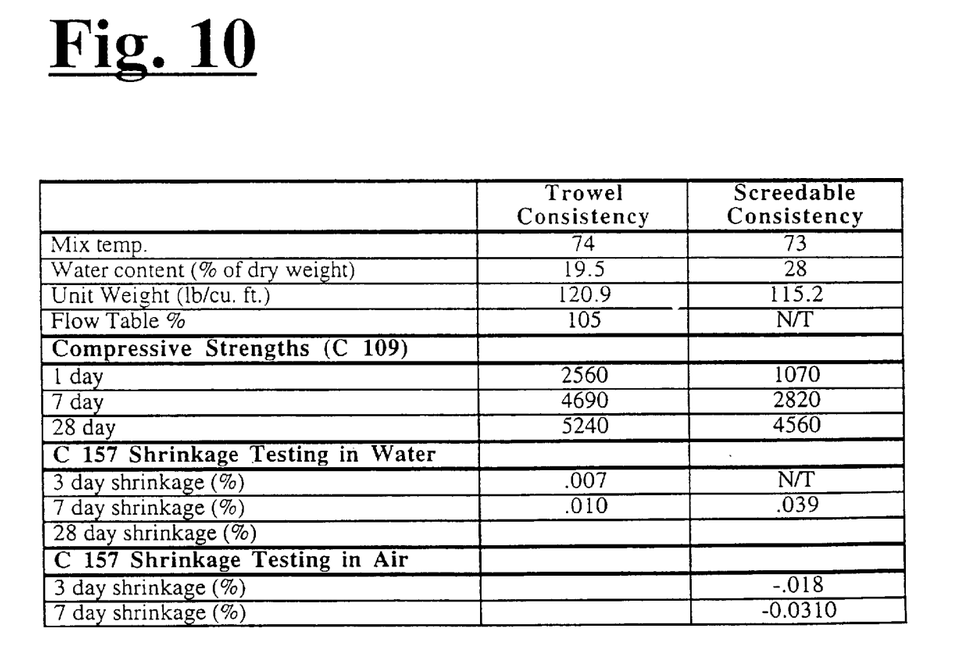
FIG. 10 is a chart showing certain characteristics of the second skid-resistant resurfacing mixture upon troweling and after curing.

FIG. 9 is a chart showing the content by weight of a second skid-resistant resurfacing mixture according to the present invention. FIG. 10 is a chart showing certain characteristics of the second skid-resistant resurfacing mixture upon troweling and after curing.

Figure 11:
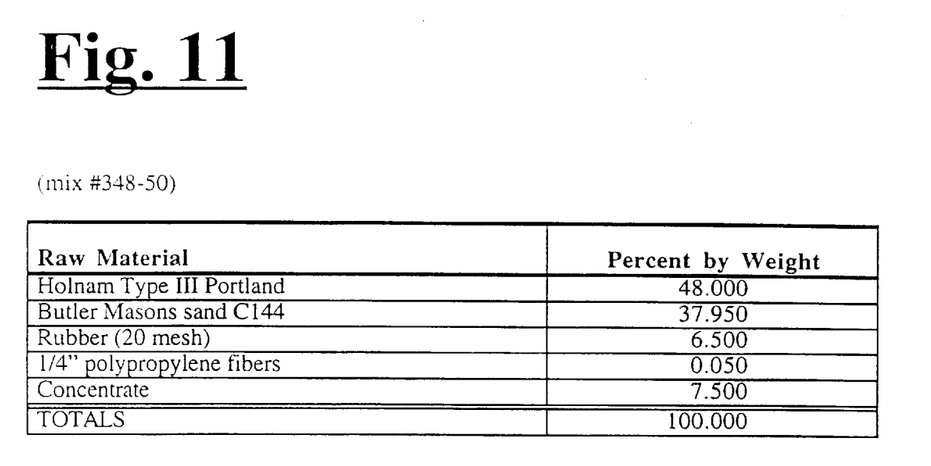
FIG. 11 is a chart showing the content by weight of a third skid-resistant resurfacing mixture contemplated for use with a premixed concentrate.
Figure 12:
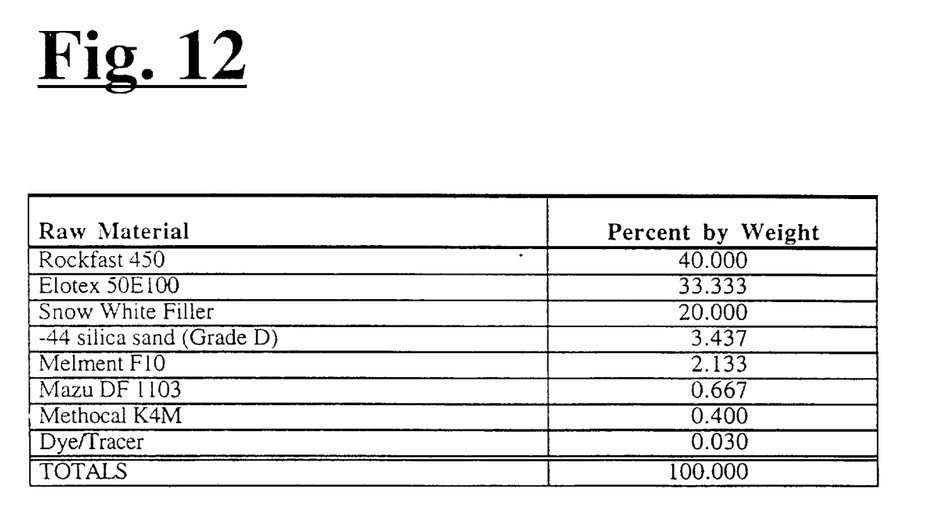
FIG. 12 is a chart showing the content by weight of a concentrate contemplated for use with the resurfacing mixture shown in FIG. 11.

FIG. 11 is a chart showing the content by weight of a skid-resistant resurfacing mixture contemplated for use with a premixed concentrate such as shown in FIG. 12. FIG. 12 is a chart showing the content by weight of a concentrate contemplated for use with the resurfacing mixture shown in FIG. 11.

Figure 13:
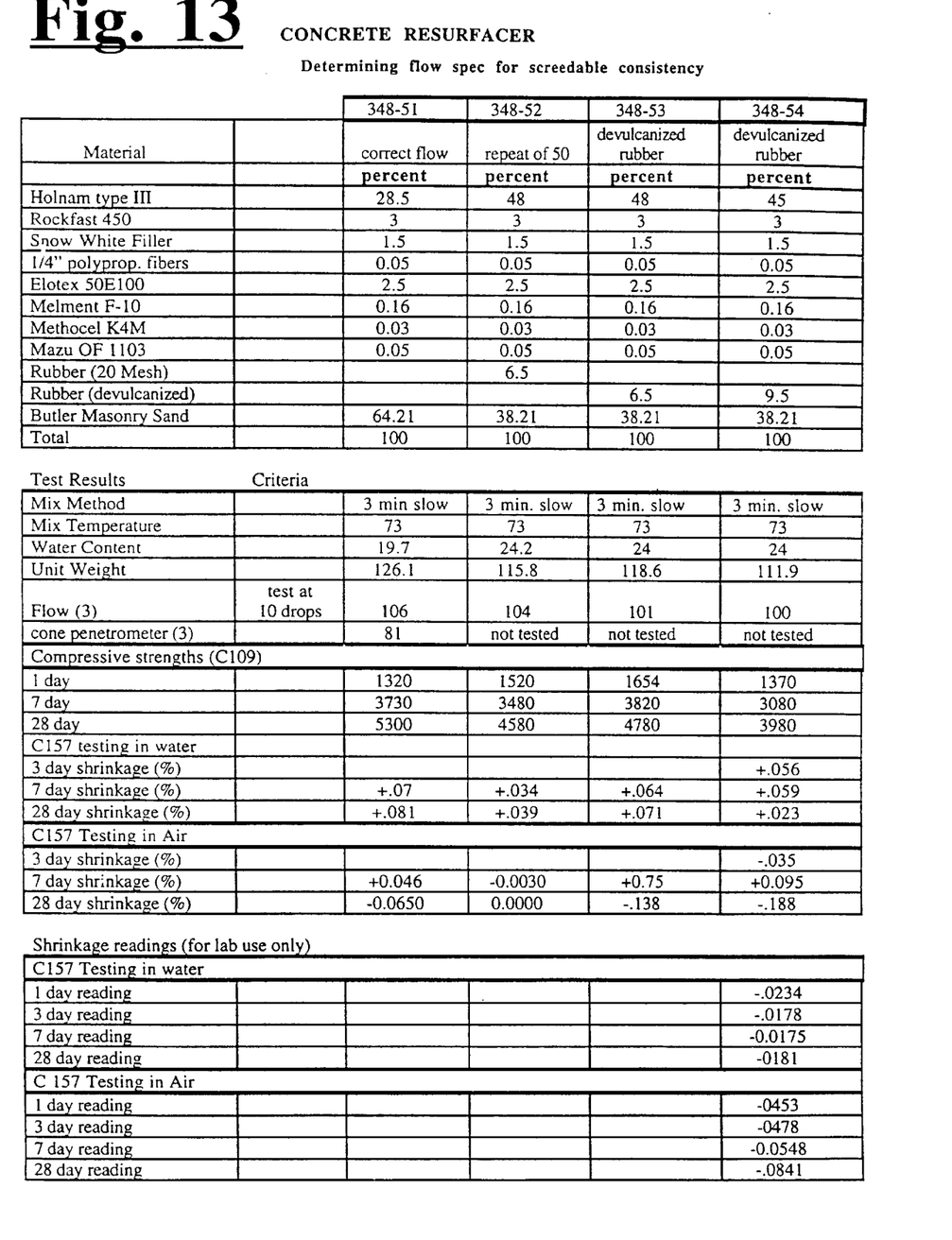
FIG. 13 is a chart showing the content by weight of additional concrete resurfacer mixes 52, 53, and 54, as well as test results for same.

FIG. 13 is a chart showing the content by weight of an additional concrete resurfacer mixes #51, #52, #53, and #54, as well as test results for same.

Mix 52 included 6½% regular rubber. Mix 53 included devulcanized rubber, with all else the same. Pullout was noted to be less. This is an important part of one invention disclosed herein.

Mix 54 added rubber to 9.5 percent (compare to 6.5 percent in Mix 53), and took cement. The sand should be 38.21. 3% of cement was taken out. This was an idea to make it less expensive. Pullout was good, strength was sufficient.

Figure 14:
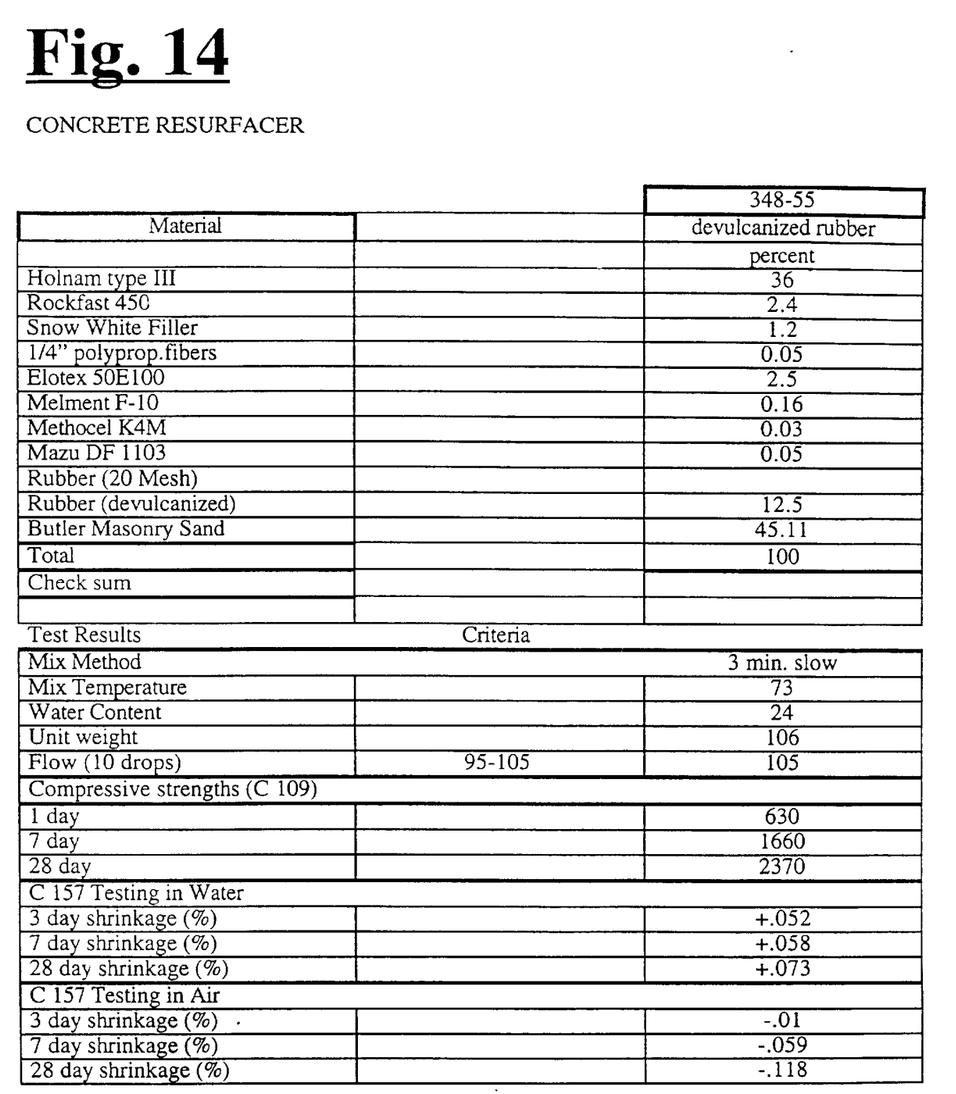
FIG. 14 is a chart showing the content by weight of an additional concrete resurfacer mix 55 according to the present invention, as well as test results for same.

FIG. 14 is a chart showing the content by weight of an additional concrete resurfacer mix #55 according to the present invention, as well as test results for same.

Figure 15:
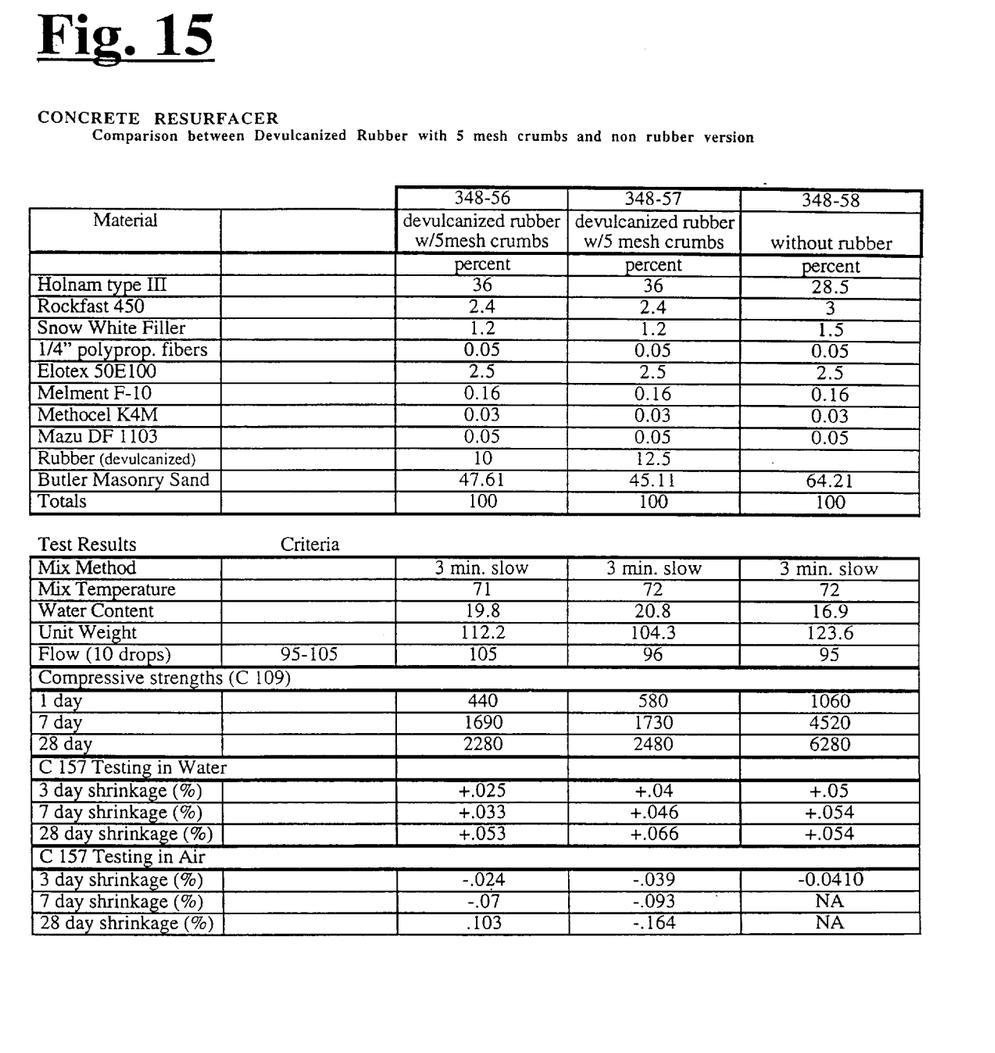
FIG. 15 is a chart showing the content by weight of additional concrete resurfacer mixes 56, 57 and 58 according to the present invention, as well as test results for same.

FIG. 15 is a chart showing the content by weight of additional concrete resurfacer mixes #56, #57 and #58 according to the present invention, as well as test results for same.

Mixes 56 and 57 show 36 percent cement, which give good pullout characteristics, sufficient shrinkage and strength characteristics.

Mix number 58 has commercial value, although it does not include rubber particles. This is due to the existence of the Elotex, which has been found to allow the mixture to be successfully laid without a bonding adhesive. Priming is therefore not needed in many cases. This concept likewise applies to the other mixes which include this component.

Figure 16:
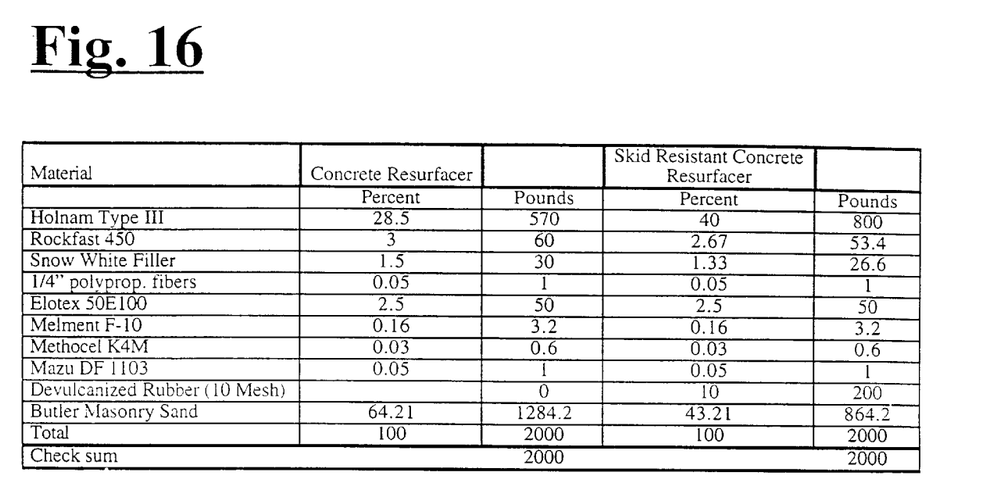
FIG. 16 is a chart showing two mixes thought to be commercially viable, one being a self-priming resurfacer dry one-ton mix and the other being a similar mix with rubber.

FIG. 16 shows two of the later mixes developed to date. This chart shows the dry composition of a one ton mix of self-priming concrete resurfacer in the first two columns, and the dry composition of a one ton mix of self-priming skid-resistant concrete resurfacer in the last two columns.

Figure 17:
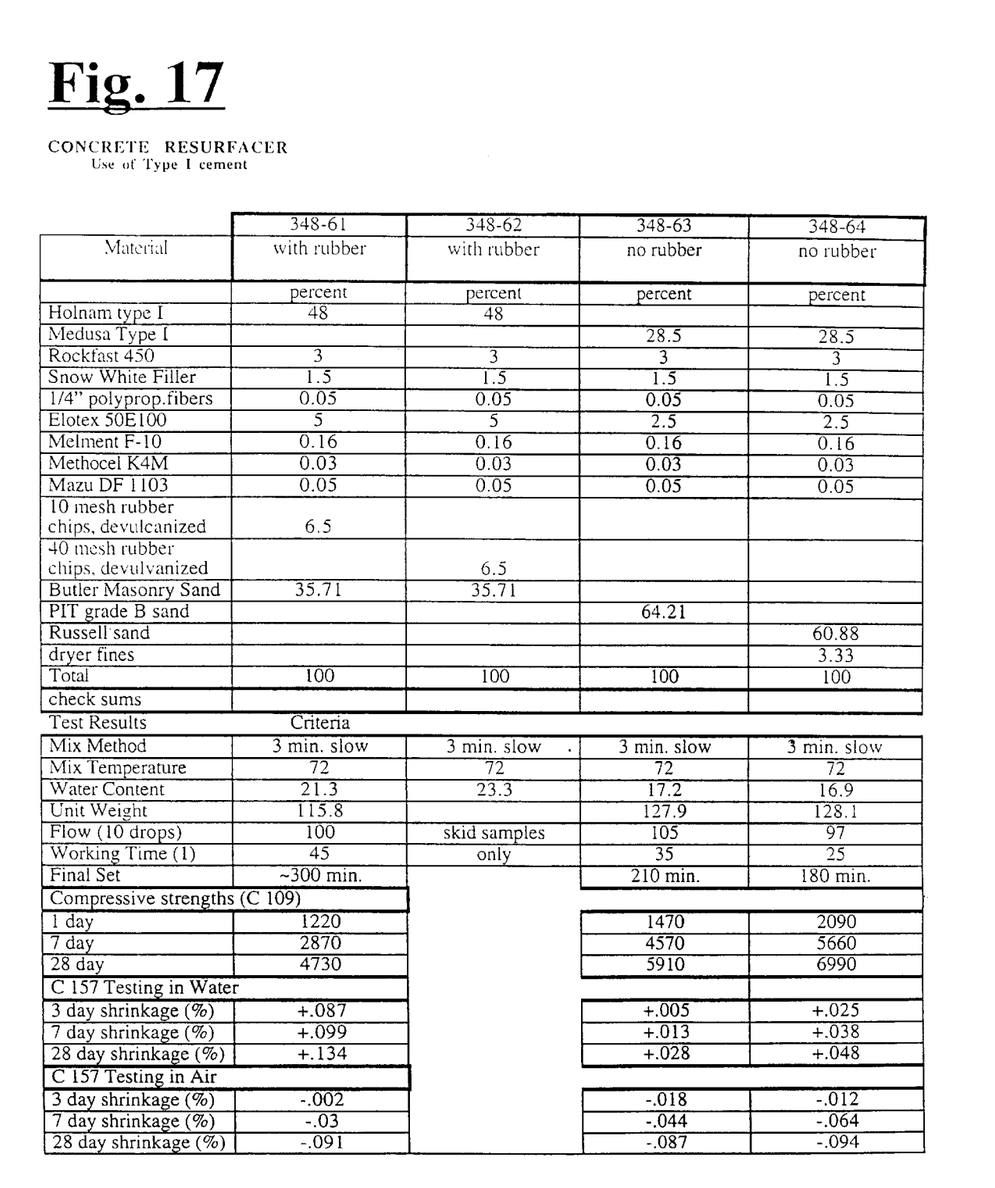
FIG. 17 is a chart showing four mixes, 61, 62, 63, and 64, two (61 and 62) with rubber, and two (63 and 64) without.

Referring now to FIG. 17, Mix 61, which includes rubber had good resistant properties, but had more pullout than desired upon being tested by the inclined plane method. It may be seen that Mix 61 includes a higher mixture of Elotex, namely 5 percent.

Mix 62 had reduced size rubber chips (compared to 61) and had much improved pullout resistance, and similar skid resistance characteristics as evidence by the British Pendulem Test discussed elsewhere. Again, a higher percent (5%) of Elotex is included and is thought to provide improved pullout resistance. As of filing, Version 62 is thought to be a preferred version. However, a version of 62 without fibers is also contemplated.

Mixes 63 and 64 are resurfacer mixes without rubber.

The Hydraulic Cement
Portland Cement type II is shown as used, but any type I, II, or III hydraulic cement could be used.

The Pulverized Limestone
This can be of the grade in which approximately 90% pass through a 325 mesh screen.

Fast Setting Hydraulic Cement
A fast setting hydraulic cement such as calcium sulfoaluminate can be used as shown in the charts. It imparts a high early strength, and is a shrinkage compensator. It can be used in the form sold under the "ROCKFAST 450" designation. Calcium aluminate cement could also be used. Other fast setting hydraulic cements could also be used.

Anhydrite
This material, which is known under the name "Snow White Filler" balances the sulfate ions. It is preferable to have a 2 to 1 weight ratio between the Rockfast and the Snow White. Other anhydrites could also be used.

Fibers
Monofilament nylon fibers such as sold by Nycon can be used, in one embodiment being ¼" long fibers about 1.0 mm in diameter. Alternatives could be fiberglass or bundled organic fibers.

Stated more specifically, alternatives could be fiberglass (bundled or unbundled), or organic fibers (bundled or unbundled). The fibers could also be longer, or fiberglass or other bundled fibers could also be used.

Ethylene/Vinyl Acetate Copolymer
An ethylene/vinyl acetate copolymer can be used under the present invention, such as that sold under the "Elotex 50E100" designation. This is a copolymer which forms a polymeric bond between aggregates including rubber chips and cementitious material.

Plasticizer/Water Reducer
Melamine Formaldehyde Condensate, such as that sold under the "MELMENT F-10" designation can be used under the present invention. It is a plasticizer as well as a water reducer. This is used to "make the water wetter". Other plasticizer/water reducers could also be used.

Hydroxypropyl Methyl Cellulose Ether
A hydroxypropyl methyl cellulose ether, such as that known under the trade name Methocel K4M sold by Dow Chemical can be used as shown in the accompanying charts. This mixture is a good thickener, and discourages separation of sand, rubber, and cement fractions of the mixture.

Dry Solid Defoamer/Deaerator
Typically, 3–20% of air by volume can be entrained within a freshly mixed cementitious mixture. The use of a solid defoamer such as that known under the trade name MAZU DF 1103 reduces entrained air in the mixture. Under the present invention, a reduction in the entrained air increases the bond between all the cementitious components and the aggregates, providing increased mechanical strength. Such a reduction of air also helps control shrinkage, cracking and volume stability.

Since as of filing of this application one of the primary uses for the mixture according to the present invention is as an overlayment, it may be understood that low shrinkage is especially important, as shrinkage during curing of the overlayment necessarily will cause relative movement between the curing overlayment and the previously cured base structure (i.e., the "old concrete").

The Rubber Particles
As previously discussed, the skid-resistant particles contemplated for use under the present invention may be rubber particles. The rubber particles also function as an aggregate.

These rubber particles can be reclaimed ground rubber provided by cryogenically or otherwise mechanically treating conventional used tire rubber segments to provide rubber particles typically in the range of 20–40 mesh, such as that supplied by American Tire Recycling, although even a range of 5 mesh to ¼ inch in size is contemplated.

The higher the rubber content, the lower the compressive strength of the product. Reducing the compressive strength will allow the concrete to wear. As noted elsewhere in this application, some wearing of the cementitious components can be preferable to provide continuous skid resistance over time.

Pull-out is a concern, therefore bonding of the rubber particles within the mixture is important principally due to the ELOTEX polymeric bond between the rubber and the cement.

Devulcanized rubber can be used in the present invention, which is believed to make it more reactive. Presently an acceptable material is as sold by STI-K Polymers America Inc., 700-W Chippewa Ave., South Bend, Ind., USA.

Devulcanized rubber is rubber which previously was vulcanized but has then been treated to uncouple the sulpher linkages in the vulcanized rubber. U.S. Pat. No. 5,602,186 to Meyers, et al. discloses one process for providing devulcanized crumb rubber. U.S. Pat. No. 5,587,700 discloses another method and apparatus for providing devulcanized crumb rubber. Another supply of devulcanized crumb rubber can be found with STI-K Polymers America, Inc., Washington D.C.

Skid resistance has been tested by preparing comparable surfaces with concrete resurfacers with and without rubber particles therein. These test show an increase in static frictional coefficients as described below.

In an example test, concrete board sections 3 feet by 4 feet by ⅜" thick such as known under the tradename WONDERBOARD were used. Various surfaces were prepared, including a surface with ⅜" concrete resurfacer with 10 mesh particles, a surface with ⅜" concrete resurfacer with 5 mesh particles, and a surface with no rubber. These three surfaces were treated with muriatic acid to expose the rubber as if they had encountered wear typical to a concrete surface. A final section was made with 10 mesh chips and sanded with a belt sander until the cementitious matrix of the mortar was smooth and slick to the touch.

Concrete blocks 8" square were placed at one end of the board on each section. That end of the board was raised until a block started to move. At that point the height measurements was taken. It was noted that even through the concrete blocks were rotated and switched from section to section the block on the section having no addition of rubber always began to move first. The concrete blocks on the sections which were treated with rubber always began to slide later with increasing elevation of the raised end of the board.

The amount of increased raise was in the range of 5 to 15% over the first movement of the non treated section. This corresponds to an increase in the co-efficient of static friction from 0.77 to 0.86.

Figure 18:
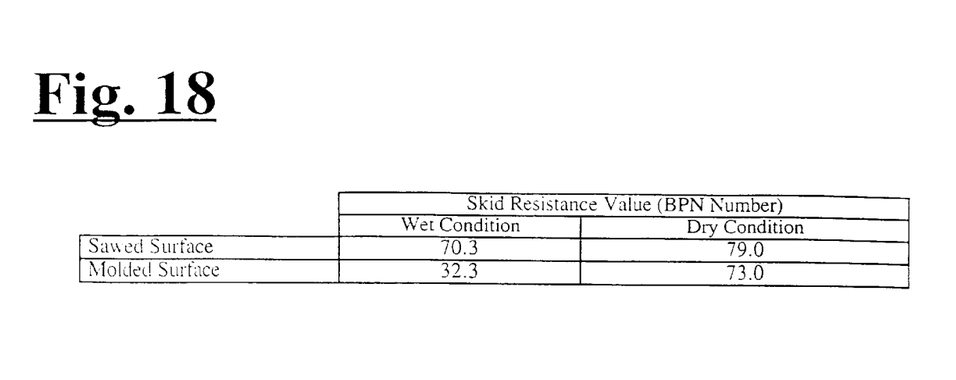
FIG. 18 is chart showing the results of a skid resistance test to Mix 62.

In accordance with ASTM E 303-83, the "Standard Method for Measuring Surface Frictional Properties Using the British Pendulum Tester", tests were conducted to determine Skid Resistance Valves for two types of surfaces defined by product version 62. As shown in FIG. 18, two surfaces were tested, a sawed surface (which exposes the rubber particles similar to that provided by etching) and a molded surface (which simulates smoothly worn plain concrete). The sawed surface gave readings of 70.3 and 79.0, for wet and dry conditions, respectively. In contrast, the molded surface gave readings of 32.3 and 73.0, respectively. This is believed to show the advantage of using the present invention.

An impact test was also conducted on version 62, according to ACI 544.2R-89, "Measurement of Properties of Fiber Reinforced Concrete", except sample thicknesses being 4 inches instead of 2.5 inches. Generally, the method employs a 10–16 hammer dropped from a height of 18 inches to impact a 2.5 inch diameter steel sphere resting on the surface of the specimen. The operator counts the number of drop hammer blows required to initiate cracking and to produce "failure". Failure for this method is defined by the amount of horizontal movement of the broken pieces of the specimens. The average total blows for Mix 62 was 55.7, which is an improvement over the 42.0 amount which was obtained for a comparable prior art resurfacer.

Sand

Preferably masonry sand should be used, although other sands such as ASTM C-33 concrete sands could be used.

Suggested Ranges of Components

Preferred mixture ratios by weight are shown in the charts. However, some ranges are possible, as noted below.

| | |
|---|---|
| Portland Cement | 20–60% |
| Rapid Setting Hydraulic Cement | 1–18% |
| Anhydrite | 1–10% |
| ¼" Poly fiber | .01–3% |
| Elotex | 1.5–5% |
| Melment | .01–.5% |
| Methocel | .01–.5% |
| Mazu | .01–.5% |
| Crumb Rubber | 2–30% |
| Sand | (balance) |

Surface Treatment of Skid-Resistant Surface

To expose the chips, a broom finish may be used. Alternatively, trowel-smoothing could be used, with an application of water provided thereafter to remove some of the cementitious mixture.

As discussed above, acid (e.g. hydraulic, muriatic) can also be used to etch cured concrete in order to further expose the skid-resistant particles. Surface-applied sugar could also be used, which retards the curing process and allow uncured top layer to be washed off.

Other surface treatments may also be used without departing from the spirit and scope of the present invention. For example, the skid-resistant surface could also be grooved if desired.

Comments Regarding Resulting Structure

In the composition described above, priming in many cases is not required, because of the use of the combination of Melment, Elotex, and Methocel. Therefore these could be considered as an "integral" primer mix. This obviates the need for primers such as acrylic primers, to seal the old surface.

An important feature to note in the present invention is that the overlayment is not as hard as other overlays as known in the art. In some prior art overlays, the compressive strength can be in the range of 6000 psi. Under the present invention, compressive strength in the range of 2000–4000 psi (such as a typical Class A or Class B concrete mixture) is provided, with this less compressive strength being utilized intentionally. This provides a slightly softer surface to intentionally allow some wear according to the present invention. Such controlled wear allows the abrasive resistance to be retained continuously, to allow the rubber particles to always be exposed instead of simply wearing away and leaving only a hard cement surface behind.

The devulcanized rubber has been found to bond better than the vulcanized rubber. This discovery enabled use of larger rubber pieces and more rubber content, while still providing desired pullout characteristics. Compressive strengths are not as great, but we are designing for controlled strength. Compressive strength at 7 days are in the range of 2000 psi (sufficient for Class B concrete), and around 2500 at 28 days.

This discovery allowed reduction to as low as 36% of portland cement, and up to 12½ percent rubber (devulcanized) and still provide a satisfactory product.

Conclusion

The present invention overcomes deficiencies in the prior art by providing an improved cementitious product which can be used as an overlayment in many cases without the need for extensive priming of the supporting surface. The present invention also provides such a structure which includes the use of a mixture of hydraulic cement and rubber particles which is provides improved skid and impact resistance while still maintaining improved pullout characteristics and maintaining sufficient structural strength. The configuration includes a desirably less amount of hydraulic cement to allow for continuous wear of the overlaid structure to allow the rubber particles therein to be continuously exposed to the traffic thereon. In practicing one feature of the invention, the re-use of waste material such as tire rubber may also be effected, providing an advantageous environmental impact.

While this invention has been described in specific detail with reference to the disclosed embodiments, it will be understood that many variations and modifications may be effected within the spirit and scope of the invention as described in the appended claims.

What is claimed is:

1. A dry mixture for mixing later with water to form a cement structure, said mixture comprising:

approximately 20–60 percent by weight of hydraulic cement;
   approximately 1–18 percent by weight of fast setting hydraulic cement;
   approximately 1–10 percent by weight of anhydrites;
   approximately 0.01–3 percent by weight of nylon fibers;
   approximately 1.5–5 percent by weight of ethylene/vinyl acetate copolymer;
   approximately 0.01–0.5 percent by weight of a water reducer/plasticizer;
   approximately 0.01–0.5 percent by weight of hydroxypropyl methyl cellulose ether; and
   approximately 2–30 percent by weight of particulated rubber; and
   approximately 0.01–0.5 percent by weight of dry solid defoamer.

2. A dry mixture for mixing later with water to form a cement structure, said mixture comprising:

approximately 20–60 percent by weight of hydraulic cement;
   approximately 1–18 percent by weight of fast setting hydraulic cement;
   approximately 1–10 percent by weight of anhydrites;
   approximately 0.01–3 percent by weight of nylon fibers;
   approximately 1.5–5 percent by weight of ethylene/vinyl acetate copolymer;
   approximately 0.01–0.5 percent by weight of a water reducer/plasticizer;
   approximately 0.01–0.5 percent by weight of hydroxypropyl methyl cellulose ether;
   approximately 0.01–0.5 percent by weight of dry solid defoamer.

3. A dry mixture for mixing later with water to form a cement structure, said mixture comprising:

approximately 28.5 percent by weight of hydraulic cement;
   approximately 3 percent by weight of fast setting hydraulic cement;
   approximately 1.5 percent by weight of anhydrites;
   approximately 0.05 percent by weight of nylon fibers;
   approximately 2.5 percent by weight of ethylene/vinyl acetate copolymer;
   approximately 0.16 percent by weight of a water reducer/plasticizer;
   approximately 0.03 percent by weight of hydroxypropyl methyl cellulose ether;
   approximately 0.05 percent by weight of dry solid defoamer; and
   approximately 60 percent by weight of sand.

4. A dry mixture for mixing later with water to form a cement structure, said mixture comprising:

approximately 28.5 percent by weight of hydraulic cement;
   approximately 3 percent by weight of fast setting hydraulic cement;
   approximately 1.5 percent by weight of anhydrites;
   approximately 0.05 percent by weight of nylon fibers;
   approximately 2.5 percent by weight of ethylene/vinyl acetate copolymer;
   approximately 0.16 percent by weight of a water reducer/plasticizer;
   approximately 0.03 percent by weight of hydroxypropyl methyl cellulose ether;
   approximately 0.05 percent by weight of dry solid defoamer; and
   approximately 65 percent by weight of sand.

5. A dry mixture for mixing later with water to form a cement structure, said mixture comprising:

approximately 48 percent by weight of hydraulic cement;
   approximately 3 percent by weight of fast setting hydraulic cement;
   approximately 1.5 percent by weight of anhydrites;
   approximately 0.05 percent by weight of nylon fibers;
   approximately 5 percent by weight of ethylene/vinyl acetate copolymer;
   approximately 0.16 percent by weight of a water reducer/plasticizer;
   approximately 0.03 percent by weight of hydroxypropyl methyl cellulose ether; and
   approximately 6.5 percent by weight of particulated rubber;
   approximately 0.05 percent by weight of dry solid defoamer; and approximately 35.71 percent by weight of sand.

6. The mixture as claimed in claim 5, wherein said particulated rubber is devulcanized.

7. The mixture as claimed in claim 6, wherein said particulated rubber is 10 mesh grade.

8. The mixture as claimed in claim 6, wherein said devulcanized rubber is 40 mesh grade.

* * * * *